Feb. 10, 1959     D. G. JORDAN     2,872,706
APPARATUS FOR POLYMERIZING VINYL MONOMERS
Filed Sept. 10, 1954
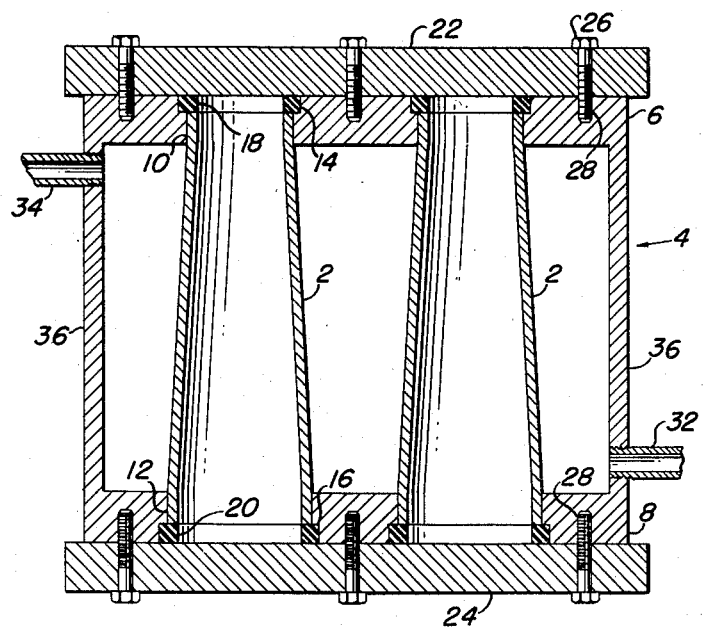
INVENTOR.
DONALD G. JORDAN,
BY
*James F. Snowden*
ATTORNEY United States Patent Office 2,872,706
Patented Feb. 10, 1959

2,872,706
APPARATUS FOR POLYMERIZING VINYL MONOMERS

Donald Gifford Jordan, Stamford, Conn., assignor to American Cyanamid Company, New York, N. Y., a corporation of Maine Application September 10, 1954, Serial No. 455,252

3 Claims. (Cl. 18—39)

This invention relates to a process and apparatus for polymerizing compounds containing a terminal ethylenic group in bulk.

In the manufacture of thermoplastic resins, bulk polymerization of the vinyl monomers or comonomers is preferred for many purposes, especially where it is important to avoid discoloration in the polymer product. Among the principal problems encountered in the bulk polymerization of compounds containing a $CH_2=C<$ group are proper control of the reaction temperature and removal of the polymerized product from the reaction vessel. In all reactions of this type excessive temperatures must be avoided to avoid discoloration in the product; moreover, many of these reactions are of an exothermic nature which require cooling. Unfortunately, the polymers which are present during a substantial part of the reaction have such low coefficients of heat transfer that they are in effect insulators; thus it is difficult to remove heat from the center of the reaction vessel through the accumulated solid polymer. The use of closed reactors capable of withstanding substantial pressures is necessary in order to avoid the loss of substantial quantities of the monomer by evaporation at the reaction temperature. The polymers tend to adhere to the reactor walls which are customarily made of a corrosion-resistant metal so tenaciously that considerable force is necessary to dislodge the product. Various types of reactors have been employed, and perhaps the most successful of these are the "pancake," or "filter-press" reactors which have shallow reaction chambers about 1 or 2 inches deep of considerable area. However, these reactors must have extremely heavy reinforcing ribs to withstand the pressures generated therein, and even then the width of these vessels can not exceed more than a few feet at the most. In addition, the removal of the polymer from the bottom of the reactor is still difficult, as it usually requires the use of hammers and cold chisels to separate the polymer cake from the metallic bottom plate. In view of the constantly increasing use of polymers of the type described herein, there is a serious need of improved polymerization processes and improved reactors.

An object of the invention is to provide an improved process for polymerizing compounds in bulk which have a terminal ethylenic group.

Another object of the invention is to provide a reactor for the bulk polymerization of such materials which is designed for the ready removal of the reaction product along with superior control of the reaction temperatures.

Other objects and benefits of the invention will be apparent to those skilled in the art, especially after consideration of the detailed disclosure hereinbelow.

The above and other advantages of the invention are obtained by polymerizing in bulk one or more compounds containing a terminal ethylenic group to a solid mass in one or more elongated chambers with a taper of at least 0.25 inch per foot of length and having at least one transverse dimension which does not exceed about 4 inches at any point along the length of the chamber while maintaining the reaction temperature within selected limits by indirect heat exchange. The invention accordingly comprises the aforesaid process in addition to a reactor suitable for carrying it out.

Amongst the monomeric organic compounds which may be used in the practice of the process of the present invention are the vinyl compounds such as styrene per se and the substituted styrenes both ring and side-chain substituted styrenes, e. g. alpha methyl styrene, alpha chloro styrene and the like, o-methyl styrene, p-methyl styrene, m-methyl styrene, 2,4-dimethyl styrene, 2,5-dimethyl styrene, 2,4,5-trimethyl styrene, p-ethyl styrene, o-bromo styrene, 2-bromo-4-ethyl styrene, p-isopropyl styrene, p-chloro styrene, 2,4-dichloro styrene. Similarly, one could use as the monomeric compounds any of those compounds containing a $CH_2=C<$ group including those containing a $CH_2=CH-CH_2-$ group. Other specific vinyl compounds which may be mentioned are the vinyl compounds which include ketones such as monovinyl ketone, methyl isopropenyl ketone, ethyl vinyl ketone, propyl vinyl ketone and phenyl vinyl ketone; vinyl carboxylates such as vinyl formate, vinyl acetate, vinyl chloroacetate, vinyl propionate, vinyl bromo propionate, vinyl stearate; heterocyclic compounds such as vinyl phthalimide, vinyl carbazol, vinyl pyrrolidone and the like.

This invention is also applicable to the polymers of such substances as butadiene, isoprene, acrylonitrile, and haloprenes such as chloroprene. Still further, these polymerizable monomers may include allyl or methallyl esters such as allyl acetate, allyl propionate, allyl chloroacetate, allyl alpha propionate, allyl caproate, allyl levolinate, allyl benzoyl benzoate, allyl benzoate, methallyl acetate, allyl laurate, allyl stearate, allyl esters of vegetable oil fatty acids such as the allyl esters of linseed oil fatty acids, allyl myristate, allyl undecylenate, allyl cyanoacetate and the like. The process of the present invention is particularly applicable to polymerizable acrylic compounds such as acrylic acid, its homologues such as methacrylic, ethacrylic, alpha-ethyl acrylic, alpha-chloroacrylic, and alpha,beta-dimethyl acrylic acids and derivatives thereof such as the anhydrides, amides, nitriles and esters of alcohols such as methyl, ethyl, propyl, butyl, isobutyl, amyl, hexyl, cycohexyl, heptyl, octyl and decyl alcohols or of nitro alcohols, such as 3-nitro-2-butanol, 2-nitro-3-hexanol, 2-methyl-2-nitro-1-butanol and 2-nitro-2-methyl propyl alcohol and polyhydric alcohols such as ethylene glycol, diethylene glycol, glycerol and the like.

The process of the present invention is further applicable to the copolymerization of allyl ketones such as allyl methyl ketone, allyl ethyl ketone, 2-chloroallyl methyl ketone and the like; vinyl compounds such as vinyl propyl succinate, vinyl butyl phthalate, vinyl diethyl citrate and the like.

In carrying out the process of the present invention the use of a catalyst is not necessary; but, in certain instances, it may be desirable to use a catalyst, in which event one could make use of any of the conventional catalysts which are commercially used in the general polymerization of these types of organic compounds. For instance, one could make use of benzoyl peroxide or the alkyl or cycloalkyl peroxides and hydroperoxides such as tertiary butyl hydroperoxide, ditertiary butyl peroxide, tetralin hydroperoxide, 1-hydroxy-cyclopentylhydroperoxide-1, 1-hydroxy-cyclohexyl-hydroperoxide-1, 1-hydroxy-cycloheptyl-hydroperoxide-1, tertiary butyl propyl peroxide, tertiary butyl pentamethyl ethyl peroxide, 2,2-bis (tertiary butyl peroxy) butane, cumene hydroperoxide and the like.

In conjunction with these peroxide catalysts, one may wish to make use of an accelerator to the polymerization in the nature of the so-called metallic driers such as the naphthenate salts of cobalt, iron, copper, manganese, lead and the like.

If a catalyst is used, it should be present in catalytic amounts such as about 0.001% up to about 1.0% by weight based on the weight of the monomers, although larger amounts may be used such as amounts up to about 5%. If it is desired to use a combination catalyst and accelerator such as the metallic driers referred to hereinabove, the amount of drier present would vary appreciably from about 0.004% up to about 0.01% by weight based on the total weight of the polymerizable monomers. In order to avoid the danger of a violent reaction, however, in carrying out the polymerization, one should avoid the use of large amounts of the metallic salt drier if the amount of catalyst present is rather substantial.

The amount of time required for carrying out the process of the present invention will depend on at least two principal factors: namely, the reaction temperature and the presence or absence of catalytic agents. One can use any temperatures which are economically feasible, bearing in mind that discoloration of light-colored products or other decomposition from excessive temperatures is seldom, if ever, desired. Depending on the particular monomeric material, temperatures between about 0° C. and 190° C. are usually preferred. If low temperatures (0–30° C.) are selected, and no catalytic agent is used, the reaction will take place over a prolonged period of time. If low temperatures such as 0–30° C. are used, and a catalyst is used, the reaction time will be appreciably shortened. If higher temperatures such as 80–130° C. are used in the absence of a catalyst, the reaction time will be comparatively brief; but if these elevated temperatures are used together with a catalytic agent, the reaction time will be very appreciably diminished. It will be seen from this that the time required for the polymerization to take place will vary rather substantially depending upon the particular conditions of the reaction. It should be sufficient to state that the reaction is permitted to continue until the polymer formed is a semi-rigid to rigid solid; or to express it in another way, the polymer should be rigid enough at room temperature to retain its own shape, notwithstanding its thermoplastic characteristics.

The temperature of the polymerization reaction is controlled by circulating a fluid, heat-transfer medium around the exterior of reaction chambers constructed according to the present invention. Coils or other heat-exchange surfaces located within the reaction chambers are not suitable because the solid product adheres so tenaciously to such structures as to defeat one of the main purposes of the present invention; namely, to facilitate the removal of the solid product from the reaction chamber. Since all compounds containing a terminal ethylenic group polymerize with an exotherm, the heat-exchange medium usually performs two functions. First, it heats the reaction mixture up to a temperature sufficient to initiate the desired reaction and thereafter it serves to cool the reactor sufficiently to prevent attaining excessive temperatures in the reaction mixture. Among the many suitable heat-exchange agents which may be employed in either gaseous or liquid form are water; aliphatic hydrocarbons, such as pentane, heptane, decane, and the like; or aromatic hydrocarbons, such as benzene, xylene, etc.; aliphatic alcohols including methanol, ethanol, butanol and the like; polyhydric alcohols such as ethylene glycol, glycerol, pentaerythritol, etc.; mercury or a eutectic mixture of diphenyl oxide and diphenyl. Wherever its temperature characteristics are suitable, steam under either atmospheric or elevated pressures is preferred by reason of its ready availability in most plants.

Another variation of the present invention may be practiced by prepolymerizing the polymerizable organic compounds by some conventional method such as by the continuous processes for such polymerization, several of which are well known in the art, until the reacting mixture contains a mixture of polymeric and monomeric material. This prepolymerization reaction can be permitted to proceed until the percentage of polymer present varies between about 20% and 50% of the total weight of initial reactants. In certain polymerization reactions, it is generally not possible to carry out the polymerization in the conventional continuous processes beyond about 50% polymer based on the total weight of polymer and monomer. This is due to the fact that the mixtures of the polymer and the monomer in concentrations greater than about 50% polymer are so viscous that it is no longer possible to continue pumping the reactants through the reaction chambers. When the prepolymerization step has been completed as indicated hereinabove, one may charge the reaction chambers described herein with the viscous mixture of polymer and monomer, seal said chambers and employ bulk polymerization to further polymerize the charge to a solid mass.

For a better understanding of the nature and objects of this invention, reference should be had to the accompanying drawing in which the figure is a sectional elevation of a multi-unit reactor according to the present invention.

In the drawing, two reaction chambers 2 are shown in the form of truncated cones with a total taper of at least about 0.25 inch and preferably about 0.35 inch or more per foot of length. These chambers are mounted in heat-exchange vessel 4 by being welded, swaged, brazed, threaded, or otherwise securely fastened to the upper and lower plates 6 and 8, respectively, which are of heavy construction. While the upper and lower ends 10 and 12, respectively, of the reaction chambers 2 may have the same taper, they are desirably of cylindrical configuration for greater ease of construction of the entire apparatus.

Adjacent to the upper edge of chamber 2 is an annular recess 14 in the upper face of plate 6 and a similar recess 16 is provided in the lower face of lower plate 8. Into these recesses are fitted the gaskets 18 and 20, respectively, which firmly contact the associated cover or clamping plates 22 and 24, respectively, and thereby seal the reaction chamber. These gaskets should be somewhat thicker than the depths of recesses 14 and 16 in order that they will seat firmly on the cover plates. Accordingly, the gaskets should be made from a resilient material which is not decomposed upon contact with either the monomeric material or the vapors thereof, in addition to being resistant to temperatures of the operating range selected. In order to reduce the adhesion of the solid polymer to gasket 20, this particular gasket should be made of a suitable material such as asbestos wrapped with stainless steel or with polytrifluorochloroethylene or polytetrafluoroethylene. Gasket 18 is desirably made of a similar inert material to eliminate possible contamination of the polymerizing mass.

The cover plates are of heavy construction and may be firmly secured to plates 6 and 8, respectively, by means of cap screws 26 which pass through both of the cover plates and into tapped holes 28 in the upper and lower plates. It will of course be appreciated that a wide variety of means may be used in securing the cover plates against the ends of the reaction chambers. For instance, screw or hydraulic presses, wedges, bolts or C-clamps may be employed for the purpose in place of the cap screws 26. In order to reduce the adhesion of the solid polymer product to the upper face of cover 24, it is recommended that this side be faced with polished chrome plating in order that no more than a sharp blow will be required to remove any cone of solid polymer therefrom.

If desired to further facilitate the removal of the truncated conical masses of product from upper face of cover 24, this may be accomplished by the provision thereon of bosses which project into the lower ends 12 of the reaction chambers. Such bosses (not shown) would preferably be plated with a layer of polished chromium. Although such bosses would probably not permit the elimination of gaskets 20 completely, it is apparent that such gaskets could be fitted around the base of the bosses and the angular recesses 16 in the lower plate could be eliminated.

Reaction chambers of truncated conical shape are preferred in the present invention, both for simplicity of construction and also because they afford the smallest area of contact with the solid product per unit of volume and are the strongest of the reactors of the type disclosed herein. However, it is also contemplated that reaction chambers of other than circular transverse cross-section may be employed if desired; thus, pyramidal reaction chambers or those of elliptical cross-section may be used, provided that they have a uniform taper of equivalent magnitude to that described herein above. In addition, the upper end of the reaction chamber 10 should always be of a practical diameter for rapid filling with liquids in commercial use; diameters of one inch and up being preferred. Although two reaction chambers are shown in the drawing as located within heat-exchange vessel 4, it will of course be apparent to those skilled in the art that each such unit may contain from one to a great number of the reaction chambers since the cover plates may be fastened to the upper and lower plates 6 and 8 in many places across their areas, and thus no sizable unsupported areas are subjected to the tremendous forces which are exerted against the plates of a pancake-type reactor.

Pipelines 32 and 34, respectively, are threaded into the sidewalls 36 of the heat-exchanger in order to circulate the heat-exchange fluid therethrough. It is usually desirable to pass a liquid medium into heat-exchanger 4 through the lower line 32 and remove it through the upper line 34; in the case of a condensable gaseous medium this circulation is usually reversed in order that the condensate may be drained from vessel 4 by means of the lower line 32.

In performing the process of the present invention with a typical ethylenic monomer, cover plate 22 is removed and the reaction chambers which are 30 inches long with an internal diameter of three inches at the bottom and two inches at the top (0.4 inch taper per foot of length) are filled with liquid styrene until about one inch of free space is left at the top, then plate 22 is securely bolted in place with cap screws 26. Atmospheric steam is introduced through pipe 34 and the condensate drains off through pipe 32 via a suitable steam trap (not shown) while the reactor is building up to reaction temperature. Thereafter, the steam trap is disconnected and steam, which is then serving as a cooling medium, exhausts through line 32 in vapor form. After a period of 96 hours, water is introduced through line 32 in order to cool the vessel to a temperature of about 20° C. Then all of the cap screws are removed from the top and bottom cover and plate 22 is removed. Next a drift pin of slightly less than two inches in diameter is inserted into the upper end 10 of each reactor and struck a sharp blow with a hammer. This loosens the solid polystyrene mass from the walls of the reaction chambers, and the vessel 4 is lifted off of bottom cover plate 24. The truncated cones of product are then easily dislodged from plate 24 by another sharp hammer-blow.

The walls of reaction chambers 2 are desirably constructed of stainless steel or equipped with linings of that or other corrosion-resisting metals to avoid discoloration of the polymers, and these walls also desirably have a smooth finish in order to reduce the degree of adhesion of the polymeric masses.

By using the process and apparatus of this invention, the polymer product is removed from the reaction chambers much faster and with a minimum of effort in comparison with the tedious processes previously employed of chipping off the polymer from the reactor surfaces with a hammer and chisel. At the same time an excellent product is obtained by reason of the superior control of reaction temperatures.

Another of the benefits of this invention is the size and shape of the product, for the truncated cones or pyramids of solid polymeric material are especially suitable for reduction by a granulating machine into granules or chips adapted to injection molding.

While there are hereinabove disclosed only a limited number of embodiments of the process and apparatus of the present invention for purposes of illustration, it is possible to produce still other embodiments without departing from the inventive concept herein disclosed; and it is desired, therefore, that only such limitations be imposed on the appended claims as are stated therein, or required by the prior art.

I claim:

1. A reactor for bulk polymerizing liquid monomers containing a terminal ethylenic group to a solid polymer which comprises a sealable rigid casing, the upper and lower sides of said casing containing aligned openings and elongated rigid tapered mold positioned in said casing and axially aligned with the openings in said casing's sides, said mold being uniformly tapered, at least 0.25 inch per foot of length and having at least one transverse dimension not exceeding about 4 inches at any point along the length of said mold, recesses around the openings in said upper and lower sides, sealing gasket members in said recesses, removable closure plates adapted to be fastened on said upper and lower casing sides to seal said tapered molds in conjunction with said gasket members, fastening means for said closure plates and means communicating with the interior of said casing to provide indirect heating means for said tapered mold by circulating heat exchange fluid through said casing.

2. A reactor according to claim 1 in which said chamber is substantially in the form of a truncated cone.

3. A reactor according to claim 1 in which said chamber is substantially in the form of a truncated cone having a maximum diameter not exceeding about 4 inches and a taper of at least 0.35 inch per foot.

References Cited in the file of this patent

UNITED STATES PATENTS

| | | |
|---|---|---|
| 1,390,257 | Dillmon | Sept. 6, 1921 |
| 1,457,290 | Schroeder | May 29, 1923 |
| 2,136,425 | Fields | Nov. 15, 1938 |
| 2,136,424 | Fields | Nov. 15, 1938 |
| 2,369,520 | Barnes | Feb. 13, 1945 |
| 2,485,798 | Whyte et al. | Oct. 25, 1949 |
| 2,698,968 | Callahan et al. | Jan. 11, 1955 |